US005991994A

United States Patent [19]

Crews

[11] Patent Number: 5,991,994

[45] Date of Patent: Nov. 30, 1999

[54] BEARING REMOVAL TOOL FOR A WHEEL HUB

[75] Inventor: R. Elliott Crews, Newport, Mich.

[73] Assignee: Chrysler Corporation, Auburn Hills, Mich.

[21] Appl. No.: 09/018,089

[22] Filed: Feb. 3, 1998

[51] Int. Cl.[6] .......... B23P 19/04

[52] U.S. Cl. .......... 29/256; 29/426.5; 29/898.08

[58] Field of Search .......... 29/263, 256, 258, 29/266, 426.5, 898.08

[56] References Cited

U.S. PATENT DOCUMENTS

| | | | |
|---|---|---|---|
| 1,346,857 | 7/1920 | Srader . | |
| 1,465,124 | 8/1923 | Gardner . | |
| 1,710,835 | 4/1929 | Nielsen | 29/263 |
| 3,007,241 | 11/1961 | Gonzalez . | |
| 3,762,021 | 10/1973 | Racin . | |
| 4,210,990 | 7/1980 | Krieger | 29/263 |
| 4,507,838 | 4/1985 | Hacker | 29/263 |
| 4,682,395 | 7/1987 | Klann | 29/261 |
| 4,761,868 | 8/1988 | Allison . | |
| 5,177,851 | 1/1993 | Skoworodko | 29/257 |
| 5,226,208 | 7/1993 | Gracey | 29/265 |
| 5,623,761 | 4/1997 | Chiang . | |

*Primary Examiner*—David P. Bryant
*Assistant Examiner*—Essama Omgba
*Attorney, Agent, or Firm*—Jennifer M. Stec

[57] ABSTRACT

A bearing removal tool and method of removing a bearing assembly for the wheel hub is provided. The bearing removal tool includes an elongated bar having a fixed end portion and a free end portion which is offset from the fixed end portion, and a cup which is adapted to engage the outer race of a bearing assembly without interfering with other components, such as a tone wheel, associated with the bearing assembly. A driving member is operably coupled between the elongated bar and the cup to urge the cup away from the elongated bar, thereby removing the bearing assembly from the wheel hub.

10 Claims, 2 Drawing Sheets

BEARING REMOVAL TOOL FOR A WHEEL HUB

TECHNICAL FIELD

This invention relates generally to a tool used in the removal of axle bearings and, more particularly, to a two piece bearing removal tool for removing the bearing assembly from the wheel hub of an axle.

BACKGROUND OF THE INVENTION

In a motor vehicle, the suspension system operably couples the wheels of the vehicle with the body. In this regard, the suspension system often includes an axle having a wheel hub disposed on each end of the axle which rotatably supports the wheels. A bearing assembly is commonly used to support rotational movement of the wheels. These bearing assemblies are subjected to severe stresses which results in wear requiring replacement of the bearing assembly. To replace the worn parts, it is first necessary to remove the bearing assembly. Since bearings are usually press fit into and tightly secured within bearing seats, their removal requires a great deal of effort and special tools. Moreover, the proliferation of parts associated with the suspension system makes access to the bearing assemblies difficult. For example, the use of an anti-lock brake system often requires the use of a tone wheel for measuring the rotational velocity of the wheel assembly. Frequently, the tone wheel is operably associated with an inner race of the bearing assembly which makes access to the bearing assembly difficult.

Currently, there are few tools specifically designed for the removal of bearing assemblies on wheels equipped with anti-lock brake systems. Likewise, there are few tools designed to readily remove a bearing assembly without having to remove other components associated with the suspension system, such as the shocks, springs, controls arms, traction bars etc. Consequently, it is common practice to remove some of these components prior to removing the bearing assembly. As a result, the removal and replacement of a bearing assembly is a time consuming and difficult task.

SUMMARY OF THE INVENTION

The present invention is therefore directed to a bearing removal tool which expedites removal of the bearing assembly and overcomes the disadvantages commonly associated with other prior art tools. In accordance with the present invention, the preferred embodiment of a simplified bearing removal tool is provided. More specifically the bearing removal tool of the present invention includes a cup which is readily positionable over the tone wheel of the bearing assembly so as to engage a portion of the outer race of the bearing assembly, and an elongated bar which is readily positionable within an aperture formed in the axle of a suspension system. A threaded driving member is disposed within an aperture formed in the elongated bar and engageable with a portion of the cup to urge the cup away from the elongated bar, thereby pushing the bearing assembly from the wheel hub of the axle. The elongated bar includes a fixed portion disposed within the aperture of the axle and a free end portion extending upwardly therefrom. The longitudinal axis of the fixed end portion is offset from the longitudinal axis of the free end portion to facilitate positioning of the elongated bar within the axle.

A general object of the present invention is to provide a simple and low cost bearing removal tool which expedites the removal of a worn bearing assembly without requiring excessive disassembly of the suspension system.

Another object of the present invention is to provide a bearing removal tool which reduces the time and cost associated with the removal and replacement of a bearing assembly.

These and other objects and advantages will become more apparent when reference is made to the following drawings and accompanying detailed description.

BEST MODE OF CARRYING OUT THE INVENTION

Figure 1:
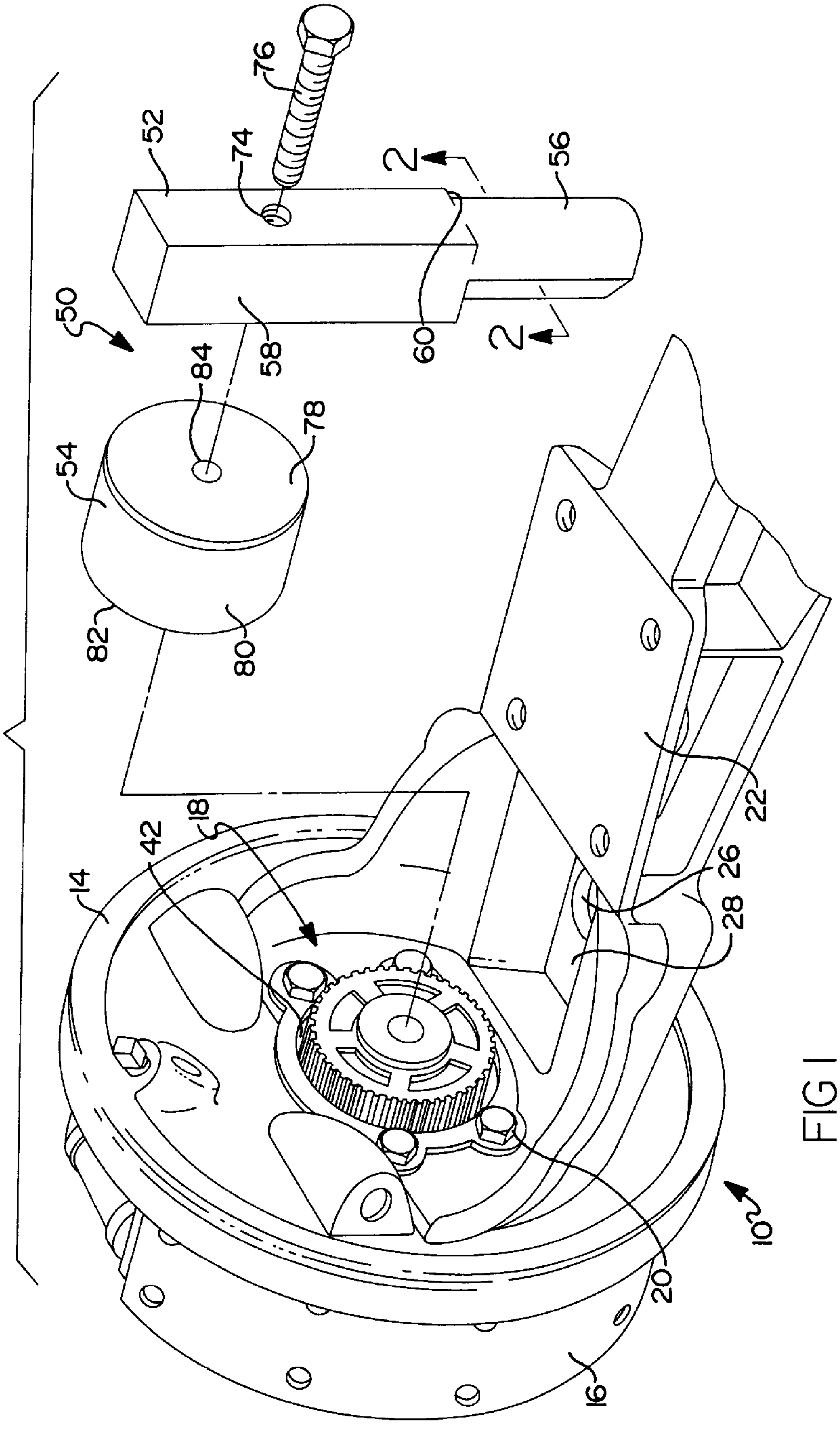
FIG. 1 is a perspective view of a portion of a suspension system and the bearing removal tool shown in an exploded manner.
Figure 3:
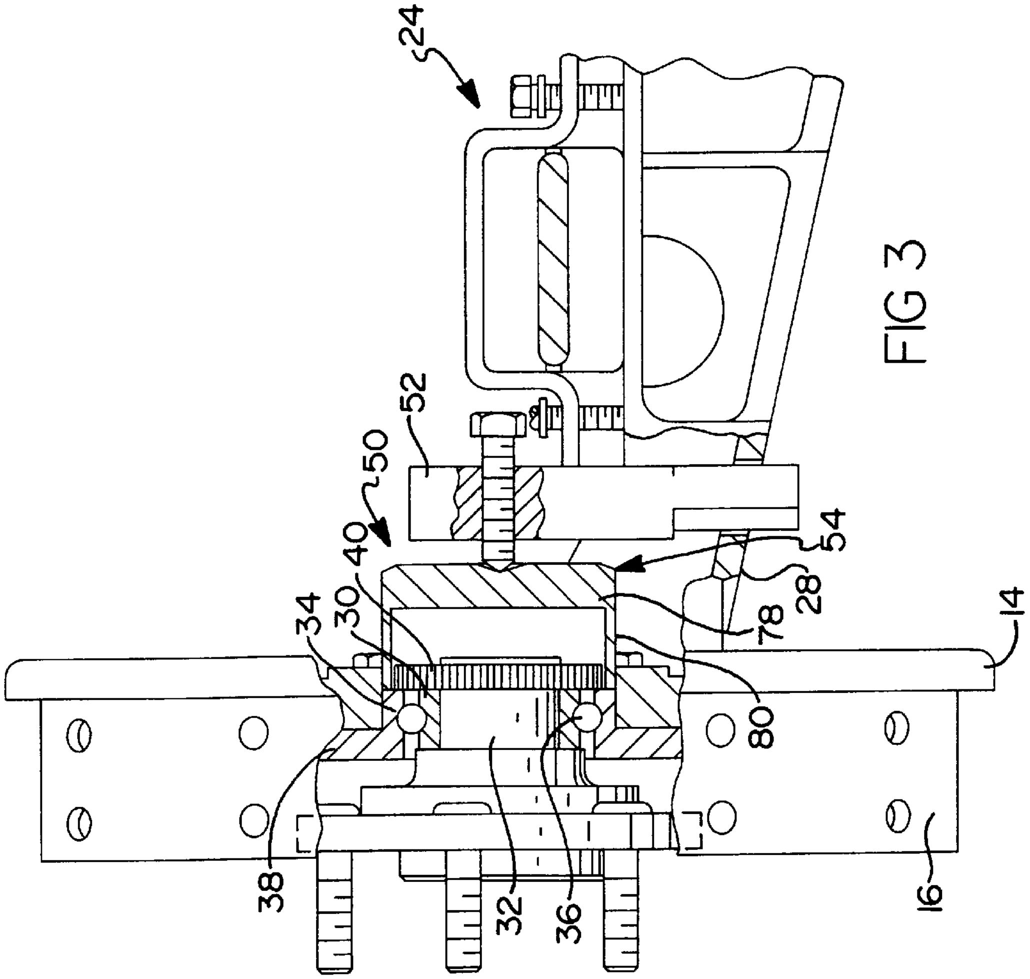
FIG. 3 is a partial cross-sectional view of the suspension system and bearing removal tool illustrated in FIG. 1.

Referring now to the drawings in greater detail, FIG. 1 illustrates a portion of suspension system 10 including axle 12 having wheel hub 14 disposed on an end thereof. Brake assembly 16 is operably coupled to wheel hub 14. Bearing assembly 18 is secured to wheel hub 14 by a plurality of fasteners 20. Axle assembly 12 includes spring seat 22 for appropriately positioning a leaf spring assembly 24 (as shown in FIG. 3). Aperture 26 is formed in lower wall portion 28 of axle 12.

With reference now to FIG. 3, bearing assembly 18 includes inner race 30 formed on spindle 32, outer race 34 fixedly secured to wheel hub 14 and a plurality of ball bearings 36 operably disposed between inner race 30 and outer race 34. Outer race 34 has a flange portion 38 formed thereon which extends radially outwardly from outer race 34 and is adapted to receive threaded fasteners 20 for securing bearing assembly 18 to wheel hub 14. In this way, bearing assembly 18 is loaded from the outboard side of wheel hub 14. Bearing assembly 18 further includes tone wheel 40 coupled for rotation with inner race 30 and spindle 32. More specifically, tone wheel 40 includes a plurality of splines along an outer surface which cooperate with a sensor (not shown) to generate a signal proportional to the rotational velocity of spindle 32 which is used for providing anti-lock control of brake assembly 16. A gap 42 is formed between tone wheel 40 and wheel hub 14 which provides access to outer race 34 from the inboard side of suspension system 10.

With continued reference to the figures, bearing tool 50 includes an elongated bar 52 and a cup 54 which are preferably fabricated from tool steel. Elongated bar 52 includes a fixed end portion 56 which is adapted to be received within aperture 26 and free end portion 58 extending upwardly from fixed end portion 56. Shoulder portion 60 is formed between fixed end portion 56 and free end portion 58. A threaded aperture 74 is formed through free end portion 52 and is adapted to receive threaded driving member 76 therethrough.

Figure 2:
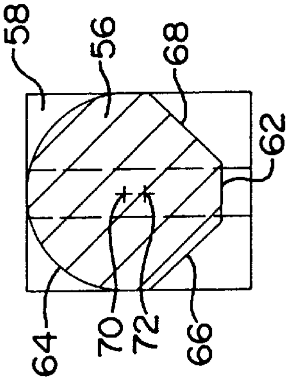
FIG. 2 is a cross-sectional view of the elongated bar of the present invention taken along 2—2 shown in FIG. 1.

With reference now to FIG. 2, in cross-section fixed end portion 56 has a substantially flat face 62, a rounded surface 64 and a pair of chamfered surfaces 66, 68 transitioning between flat face 62 and rounded face 64. As such, fixed end portion 56 defines a central longitudinal axis 70 in cross-section. Free end portion 58 is substantially square and defines a central longitudinal axis 72 which is parallel to, but spaced apart from, central longitudinal axis 70 associated with fixed end portion 56. In this way, fixed end portion 56 is offset from free end portion 58 to facilitate insertion of elongated member 52 into aperture 26 of axle 12.

Cup 54 includes base 78 and side wall 80 extending from the outboard side of base 78 and terminating at free edge 82. Countersink 84 is centrally formed in the inboard side of base 78 and is adapted for engagement with an end of threaded driving member 76.

With continued reference to FIGS. 1 and 3, the method of removing bearing assembly 18 from wheel hub 14 of axle 12 will now be described. Threaded fasteners 20 are removed to unsecure bearing assembly 18 from wheel hub 14. Cup 54 of bearing removal tool 50 is positioned over bearing assembly 18 such that side wall 80 is inserted into gap 42 formed between tone wheel 40 and wheel hub 14. Free edge 82 of cup 54 engages a portion of outer race 38 of bearing assembly 18 such that a spaced relationship between base 78 and tone wheel 40 is maintained. Fixed end portion 56 of elongated bar 52 is inserted into aperture 26 and elongated bar 52 is positioned such that the outboard end of driving member 76 engages countersink 84 formed in base 78 of cup 54. Fixed end portion 56 of elongated bar 52 bears against spring mount assembly 24 and lower wall portion 28 of axle 12 to maintain the appropriate position of elongated bar 52 relative to cup 54. In this way, elongated bar 52 is only constrained at fixed end portion 56, thereby maximizing the access to free end portion 58. Driving member 76 is rotated to urge cup 54 away from elongated bar 52, thereby pushing outer race 34, and thus bearing assembly 18, out of engagement from wheel hub 14.

As should be appreciated from the detailed description set forth above, the bearing removal tool of the present invention provides a simple and effective instrument for removing a bearing assembly from a wheel hub without damage occurring thereto. While the foregoing discussion discloses and describes various exemplary embodiments of the present invention, one skilled in the art will readily recognize from such discussion, and from the accompanying drawings and claims, that various changes, modifications and adaptations can be made herein without departing from the scope and spirit of the invention as defined by the following claims.

What is claimed:

1. A tool for removing a bearing assembly from a hub unit of an axle, wherein the bearing assembly is provided with an outer race rotatably supporting an inner race on a plurality of bearing elements, the tool comprising:

an elongated bar including a free end portion having an aperture formed therethrough and a fixed end portion positionable within a throughbore formed in said axle;

a cup having a base and a side wall extending from said base and terminating at a free edge, said free edge enageable with said outer race; and a driving member received within said aperture and extending generally perpendicularly from said elongated bar for releasable engagement with said base of said cup, said driving member being positionable relative to said elongated bar to urge said cup away therefrom.

2. The bearing removal tool of claim 1 wherein said free end portion has a first central longitudinal axis and said fixed end portion has a second central longitudinal axis which is parallel to but spaced apart from said first central longitudinal axis.

3. The bearing removal tool of claim 2 wherein said free end portion is substantially rectangular in cross section and said fixed end portion includes a substantially flat surface and a rounded surface.

4. The bearing removal tool of claim 1 wherein said elongated bar comprises a shoulder portion formed between said fixed end portion and said free end portion.

5. The bearing removal tool of claim 1 wherein said aperture formed through said free end portion of said elongated member is a threaded aperture and said driving member is a threaded member such that rotation of said driving member in a first direction urges said cup away from said elongated bar.

6. The bearing removal tool of claim 1 wherein a side of said base opposite said first side has a countersink formed therein, said driving member having a first end alignable and engageable with said countersink.

7. The bearing removal tool of claim 1 wherein said side wall maintains a spaced relationship between said base and a tone wheel operably associated with the bearing assembly.

8. A method for removing a bearing assembly from a wheel hub of an axle, wherein the bearing assembly is provided with an outer race rotatably supporting an inner race on a plurality of bearing elements, the method comprising the steps of:

providing a cup having a base and a side wall extending from said base and terminating at a free end;

placing said cup over said bearing assembly such said free edge engages a portion of said outer race of said bearing assembly;

providing an elongated bar including a free end portion having an aperture formed therethrough and a fixed end portion, said aperture receiving a driving member;

inserting said fixed end portion into a hole formed in said axle;

positioning said elongated bar such that a first end of said driving member engages said base;

manipulating said driving member in a first direction to engage and urge said cup away from said elongated bar, thereby removing the bearing assembly from the wheel hub.

9. The method of claim 8 wherein the step of placing said cup over a bearing assembly further comprises maintaining a spaced relationship between said base and a tone wheel operably associated with said bearing assembly.

10. The method of claim 8 wherein the step of providing an elongated bar further comprises offsetting a first central longitudinal axis of said free end portion from a second central longitudinal axis of said fixed end portion such that said second longitudinal axis is parallel to but spaced apart from said first central longitudinal axis.

* * * * *